United States Patent [19]

Brand

[11] Patent Number: 5,200,251
[45] Date of Patent: Apr. 6, 1993

[54] FILAMENT WOUND COMPOSITE STRUCTURE, ITS TOOLING AND METHOD OF MANUFACTURE

[75] Inventor: Christopher B. Brand, Alexandria, Va.

[73] Assignee: General Dynamics Corporation, Space Systems Division, San Diego, Calif.

[21] Appl. No.: 718,121

[22] Filed: Jun. 20, 1991

[51] Int. Cl.⁵ .............................................. B32B 3/00
[52] U.S. Cl. ................................. 428/156; 428/120; 428/167; 428/131; 428/132; 428/212; 428/213; 244/119; 52/630
[58] Field of Search ............... 428/156, 178, 167, 120, 428/172, 119, 36.9, 122, 131, 132, 137, 906, 141, 188, 212, 213; 244/119; 52/630, 730

[56] References Cited

U.S. PATENT DOCUMENTS 4,894,272  1/1992  Aisley ................................. 428/167
5,098,752  3/1992  Chang et al. ........................ 428/167

Primary Examiner—Donald J. Loney
Attorney, Agent, or Firm—John R. Duncan; Frank D. Gilliam

[57] ABSTRACT

A filament wound composite structure, its tooling and method of manufacture. The isogrid filament wound composite structure is formed having at least one or more pseudo-isotropic laminate zones in its joint regions. This structure is realized through the use of specialized tooling. The ribs of the isogrid filament wound composite structure are discontinued by tapering them out into a thin skin. This is accomplished by gradually widening the grooves in the mandrel while simultaneously decreasing the depth of the grooves. This gradual change in the tooling redistributes the material in the ribs into a thin skin. The fibers that are redistributed into this thin layer, coupled with the skin wound over the top of the ribs, provide the necessary reinforcement in the joints.

7 Claims, 3 Drawing Sheets

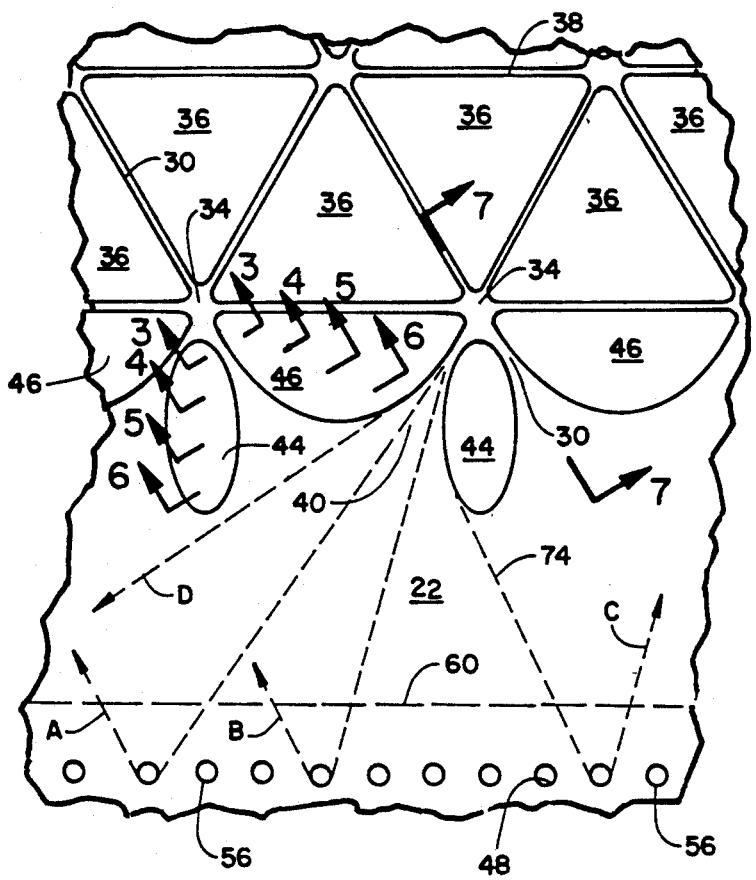
FIGURE 2C
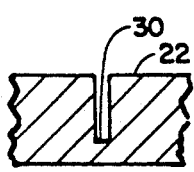 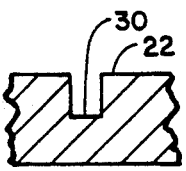 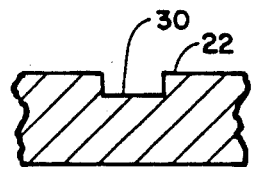 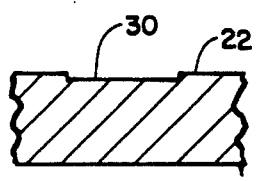
FIGURE 3   FIGURE 4   FIGURE 5   FIGURE 6
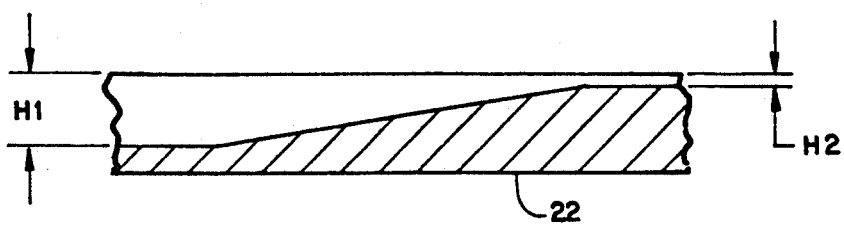
FIGURE 7

FILAMENT WOUND COMPOSITE STRUCTURE, ITS TOOLING AND METHOD OF MANUFACTURE

BACKGROUND OF THE INVENTION

This relates in general to isogrid filament wound composite structures and more specific to the formation of pseudo-isotropic laminate zones in some of the joint regions of the structure.

The isogrid concept consists of a repetitive triangular pattern of ribs with an integral skin. Its name is derived from the term "isotropic" which means that the structure has essentially the same mechanical properties in all directions on a global level. This provides the structure with the unique advantage of not requiring ring frames for compression loaded cylinders (except for large length-to-diameter ratios), thereby reducing part count and assembly operations. Typically, the isogrid structure is either machined from a metal structure or it is produced by chem milling. The unique concept of the invention can be applied to composite material to take advantage of the mass reduction available with composite materials' high specific strength and modules. The isogrid concept is most efficiently produced using filament winding. The ribs of the isogrid ribs are produced by repetitively winding fibers (pre-impregnated or wet) into recesses built into the winding mandrel. After the recesses have been completely filled, skin is filament wound over the top of these recesses. The entire structure is then cured as a unit. After completion of the cure, the segmented mandrel is removed, leaving a nearly complete structure. The problem arises when it is necessary to provide local reinforcement for joints and cutouts that are always present in aerospace structures.

Typically it is desirable to discontinue the ribs or stringers in the local vicinity of the joint or cutout so they do not interfere or complicate the design of the hardware associated with molded joints and also to provide smooth introduction of loads into the structure.

In addition, it is necessary to increase the thickness of the structure in the joint region due to the concentrated loads being introduced and due to the stress concentrations created by bolt holes. This requirement for local reinforcement is complicated by two interrelated factors. First, composite materials are inherently anisotropic (they have different mechanical properties in different directions in the plane of a laminate). In order to design efficient and failure resistant joints in composite materials, fibers must be oriented in multiple directions (relative to the loading direction). When fibers are dispersed in all directions, the resulting laminate is termed "pseudo-isotropic".

A second factor that complicates local joint reinforcement is the fact that filament winding cannot provide localized reinforcement of fiber orientations of other than 90° degrees because filament winding is a process that produces structure by continuously wrapping or winding a bundle of fibers around a mandrel (similar to winding a ball of string). Therefore the "local" reinforcement in the joint region must be done either by and lay-up or by secondary assembly operations. Both methods significantly increase the recurring costs of these structures.

It is an object of the invention to provide a novel isogrid concept that produces low cost joints for filament wound composites in the aerospace industry.

It is also an object of the invention to provide a novel isogrid concept for automatically providing reinforced joints that eliminate material scrappage, secondary operations and reduces part count.

It is another object of the invention to provide a novel isogrid concept that overcomes the problem of high cost associated with providing for joints in typical filament wound isogrid structures.

SUMMARY OF THE INVENTION

The essence of the invention is to simultaneously provide for the tapering of the ribs and provide a pseudo-isotropic laminate in the joint regions of the filament wound composite isogrid structures. The invention is realized through the use of specialized tooling that will be described later. The ribs are discontinued by tapering them out into a thin skin. This is accomplished by gradually widening the recess in the mandrel while simultaneously decreasing the depth of the recess. This gradual change in the tooling redistributes the material in the ribs into a thin skin. Fibers that are redistributed into this thin layer, coupled with the skin wound over the top of the ribs, provide the necessary reinforcement in the joints.

The requirement that have a "pseudo-isotropic" lay-up in the joints is achieved by forcing different fiber bundles to take different paths as they emerge from the recesses. Because the fiber bundles would not be stable (they would tend to slip into equilibrium positions) over some of these paths, they are wound around pins that are embedded in the mandrel. The part would be "unlocked" from the pins after cure by trimming it along a line several inches inside of the pins.

The previous discussion describes the structure for incorporation the joint at the ends of a structure such as an intertank adapter. This concept is also applicable to reinforcement for access doors, cut-outs, and for ring frame attachments. This would be accomplished using very similar tooling methods as described earlier. The only difference being that there are no "turn around pins". In this instance, the different fiber paths are generated by having different fiber bundles exiting from the same recess enter into different recesses on the opposite side of the access door for example.

Other objects and features of the invention will become apparent as the drawings which follow are understood by reading the corresponding description thereof.

DESCRIPTION OF THE FIGURES OF THE DRAWINGS

FIG. 2C is a top plan view taken along lines C—C of FIG. 2;

FIG. 3 is a partial cross sectional view taken along lines 3—3 of FIG. 2C;

FIG. 4 is a partial cross sectional view taken along lines 4—4 of FIG. 2C;

FIG. 5 is a partial cross sectional view taken along lines 5—5 of FIG. 2C;

FIG. 6 is a cross sectional view taken along lines 6—6 of FIG. 2C;

FIG. 7 is a partial cross sectional view taken along lines 7—7 of FIG. 2C;

DESCRIPTION OF THE PREFERRED EMBODIMENT

The novel filament wound composite structure, its tooling and method of manufacture will now be described by referring to FIGS. 1-9 of the drawings.

Figure 1:
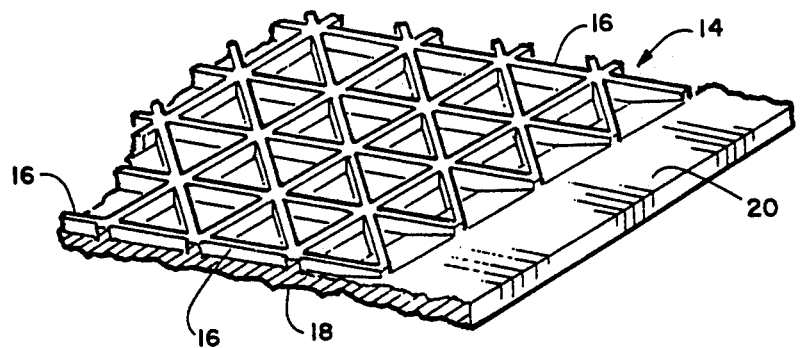
FIG. 1 is partial front perspective view illustrating a prior art isogrid structure incorporating a joint reinforcement section.

The prior art isogrid structure 14 is illustrated in FIG. 1. It has multiple intersecting ribs 16 having a skin 18 integrally connected to the bottom edges of the ribs. A joint reinforcement section 20 is formed along one of the lateral edges of the isogrid structure 14.

Figure 2:
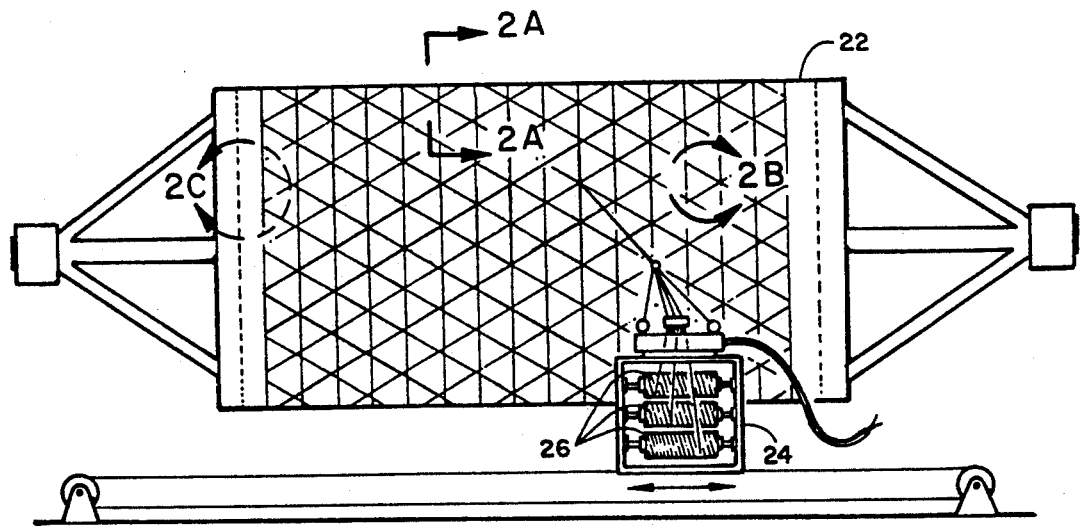
FIG. 2 is a schematic elevational view illustrating the manner in which a filament wound composite structure is formed on a mandrel.

The structure for filament winding of the isogrid structure is schematically illustrated in FIG. 2. Shown is a mandrel 22 having a winding head 24 that travels back and forth as the mandrel is rotated. Winding head 24 has a plurality of fiber reels 26. The operation of the mandrel and the winding operation is standard present day state-of-the-art.

Cross sectional view 2A shows the ribs 16 that have been formed from the multiple layers of filament 28 that are formed in the grooves or recesses 30. Skin 18 is wound over the top edge of the ribs 16 prior to the structure being cured.

Figure 2B:
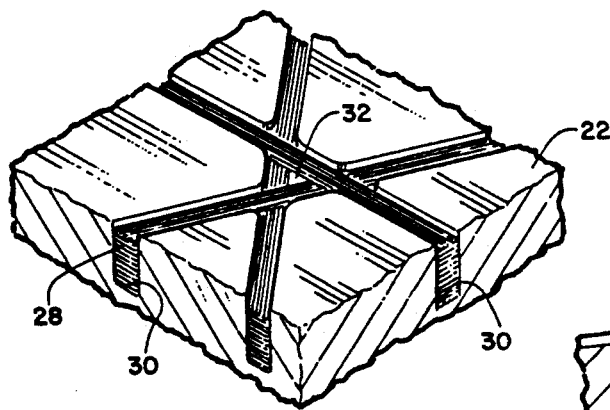
FIG. 2B is a front perspective view taken along lines B—B of FIG. 2.
Figure 2A:
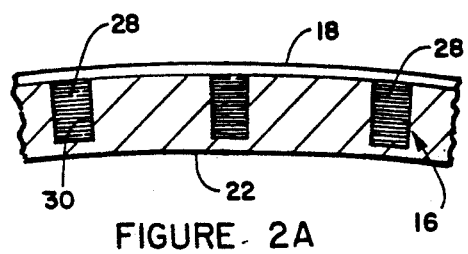
FIG. 2A is a sectional view taken along lines A—A of FIG. 2.

Several sectional views have been made of FIG. 2C. FIG. 2B shows the different layers of filaments 28 laid up in the grooves or recesses 30 of the mandrel at one of its joint sections 32.

Figure 10:
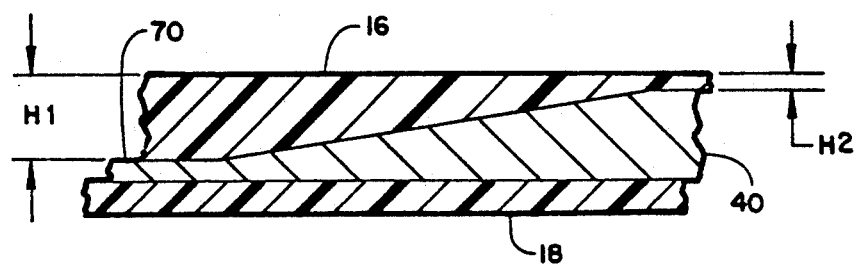
FIG. 10 is a partial cross sectional view of a rib produced in the groove illustrated in FIG. 7.

In FIG. 2C, the manner for forming the inventor's novel pseudo-isotropic laminate zones is illustrated. The intersecting grooves 30 meet at a groove junction 34. Formed between these grooves are triangularly shaped boss members 36 having an outer wall surface 38. The psuedo-isotropic laminate zone 40 is best described by referring to FIGS. 3-7. The grooves 30 that are formed in this area produce the ribs whose structure discontinues itself by tapering out into a thin skin see FIG. 10. This is accomplished by gradually widening the grooves in the mandrel while simultaneously decreasing the depth of the groove. This gradual change in the tool redistributes the material in the ribs into a thin skin. The ribs at their greatest height have a dimension H1 that tapers to a dimension H2 which is the thickness of the pseudo-isotropic laminate zone. Oval shaped boss members 44 and cord shaped boss members 46 are formed between the respective grooves 30 and 35.

Also in FIG. 2C there are a plurality of bore holes 48 in which pins 50 are inserted. The requirement to have a "pseudo-isotropic" lay-up in the joint is achieved by forcing different fiber bundles to take different paths as they merge from the grooves. Because the fiber bundles would not be stable over some of these paths, they are wound around pins 50 in mandrel 22 as illustrated by the lines (A,B,C,D) in FIG. 2C. The part would be "unlocked" from the pins 50 after cure by trimming along a trim line 60 several inches inside of the pins.

Figure 8:
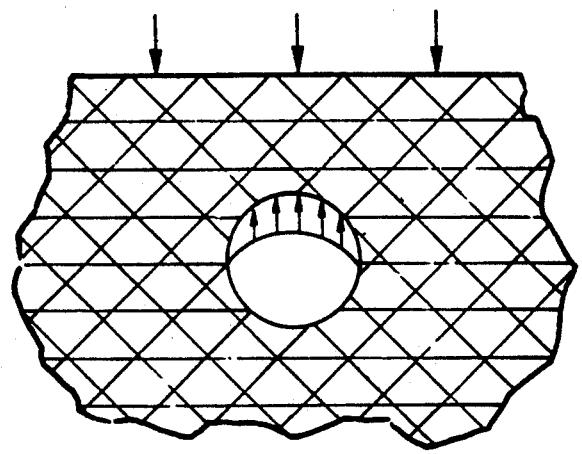
FIG. 8 is a schematic illustration showing fibers that are dispersed in all directions that produce a resulting laminate that is termed "pseudo-isotropic"'

FIG. 8 is a schematic illustration showing that the fibers must be oriented in multiple directions. This is due to the fact that composite materials are inherently anisotropic (they have different mechanical properties in different directions in the plane of a laminate). When the fibers are dispersed in all directions as illustrated in FIG. 8, the resulting laminate is termed "pseudo-isotropic".

Figure 9:
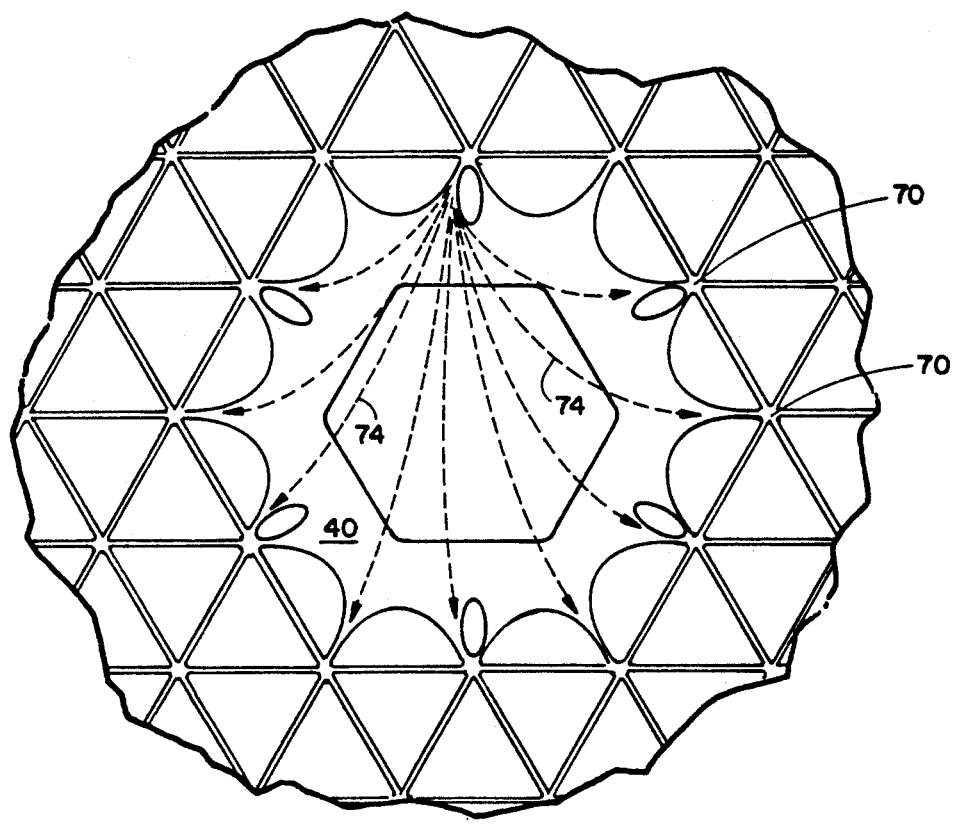
FIG. 9 is a schematic top plan view of the filament wound composite structure that would be formed for access doors, cutouts, and for ring frame attachments.

The illustration in FIG. 9 shows the novel filament wound composite structure that would be used for access doors, cut-outs, and for ring frame attachment. The pseudo-isotropic laminate zone 45 is formed by different fiber paths that are generated by having the different fiber bundles exiting from the same groove enter into different grooves on the opposite side of the access door for example. The different fiber bundles exit from groove junctions 70 and take the paths illustrated. The trim line 72 is illustrated in a dot-dash lines for an access door. The winding paths are designated numeral 74.

While a specific embodiments of the invention has been shown and fully explained above for the purpose of illustration it should be understood that many alterations, modifications and substitutions may be made to the instant invention disclosure without departing from the spirit and scope of the invention as defined by the appended claims.

What is claimed is:

1. An isogrid filament wound composite structure having at least one or more pseudo-isotropic laminate zones in its joint regions comprising;

a primary skin sheet configured as a section of a conical surface, said primary skin sheet having a top surface and a bottom surface;

a plurality of ribs each having a top surface and a bottom surface, the bottom surface of said ribs being integrally connected to the top surface of said primary skin sheet and said ribs intersecting each other at predetermined angles to form a plurality of joint sections; and some of said joint sections having a psuedo-isotropic zone formed by some of its ribs being discontinued by tapering their height in the direction away from said joint section, at the same time that the height of said ribs are being shortened, the width of the ribs are tapered outwardly to be wider, the pseudo-isotropic laminate zone has a top surface formed integrally with the bottom surface of said ribs and the pseudo-isotropic laminate zone has a bottom surface integrally formed with the top surface of said primary skin sheet, the resulting structure provides local reinforcement for the joints and cut-outs that are frequently present in aerospace structures.

2. The isogrid filament wound composite structure as recited in claim 1 wherein the top surface of said ribs whose height has been tapered is substantially a constant height above the top surface of said primary skin sheet.

3. Tooling for an isogrid filament wound composite structure having at least one or more pseudo-isotropic laminate zones in its joint regions comprising:

a cylindrical mandrel having an outer surface having a plurality of primary and secondary grooves intersecting each other at predetermined angles to form a plurality of groove junctions, said primary and secondary grooves form primary raised boss members between themselves having a predetermined configuration; and at least one of said grove junctions having substantially constant width and height primary grooves coming into said groove junction from one of its lateral sides, secondary grooves coming into said grove junction and said secondary grooves have a width that tapers to become narrower as they get closer to said groove junction while simultaneously increasing the depth of said secondary grooves as they approach said groove function, secondary raised boss members are formed between said secondary groves.

4. Tooling as recited in claim 3 wherein said primary raised boss members have a substantially triangular configuration.

5. Tooling as recited in claim 3 wherein some of said secondary raised boss members have a substantially oval configuration.

6. Tooling as recited in claim 3 wherein some of said secondary raised boss members have the shape of a chord or a circle.

7. Tooling as recited in claim 3 further comprising a plurality of outwardly extending bore holes in the outer surface of said mandrel and at least some of these bore holes have outwardly extending pins in them to provide a structure around which fibers may be wound during the formation of an isogrid filament wound composite structure.

* * * * *